US010822500B2

(12) United States Patent
Glas et al.

(10) Patent No.: US 10,822,500 B2
(45) Date of Patent: Nov. 3, 2020

(54) PREPARATIONS AS HYDROPHOBING AGENTS

(71) Applicant: RUDOLF GMBH, Geretsried (DE)

(72) Inventors: Helmut Glas, Penzberg (DE); Christine Albert, Bruckmuehl (DE); Gunther Duschek, Benediktbeuern (DE); Dirk Sielemann, Wolfratshausen (DE)

(73) Assignee: RUDOLF GMBH, Geretsried (DE)

( * ) Notice: Subject to any disclaimer, the term of this patent is extended or adjusted under 35 U.S.C. 154(b) by 0 days.

(21) Appl. No.: 16/315,357

(22) PCT Filed: Jul. 6, 2017

(86) PCT No.: PCT/EP2017/066994
§ 371 (c)(1),
(2) Date: Jan. 4, 2019

(87) PCT Pub. No.: WO2018/007549
PCT Pub. Date: Jan. 11, 2018

(65) Prior Publication Data
US 2019/0309174 A1 Oct. 10, 2019

(30) Foreign Application Priority Data
Jul. 7, 2016 (DE) .................. 10 2016 212 443

(51) Int. Cl.
C08G 18/71 (2006.01)
B05D 1/18 (2006.01)
B05D 1/28 (2006.01)
B05D 5/00 (2006.01)
B05D 1/02 (2006.01)
C09D 5/02 (2006.01)
C08G 18/16 (2006.01)
C08G 18/36 (2006.01)
C08G 18/38 (2006.01)
C08G 18/73 (2006.01)
(Continued)

(52) U.S. Cl.
CPC ............... C09D 5/022 (2013.01); B05D 1/02 (2013.01); B05D 1/18 (2013.01); B05D 1/28 (2013.01); B05D 5/00 (2013.01); C08G 18/10 (2013.01); C08G 18/168 (2013.01); C08G 18/2825 (2013.01); C08G 18/2865 (2013.01); C08G 18/2875 (2013.01); C08G 18/3206 (2013.01); C08G 18/36 (2013.01); C08G 18/3821 (2013.01); C08G 18/71 (2013.01); C08G 18/73 (2013.01); C08G 18/7621 (2013.01); C08G 18/792 (2013.01); C08L 75/04 (2013.01); C09D 133/068 (2013.01); C09D 133/14 (2013.01); C09D 175/02 (2013.01); C09D 175/04 (2013.01); C09D 175/12 (2013.01); C14C 11/006 (2013.01);

D06M 15/564 (2013.01); D21H 19/20 (2013.01); D21H 19/30 (2013.01); B05D 2203/20 (2013.01); B05D 2203/22 (2013.01); B05D 2503/00 (2013.01); D06M 2200/12 (2013.01)

(58) Field of Classification Search
CPC .... C09D 5/022; C09D 175/04; C09D 175/02; C09D 175/12; C09D 133/14; C09D 133/068; C08G 18/71; C08G 18/2875; C08G 18/792; C08G 18/3206; C08G 18/2865; C08G 18/10; C08G 18/2825; C08G 18/73; C08G 18/3821; C08G 18/36; C08G 18/168; C08G 18/7621; C08G 18/6225; D21H 19/30; D21H 19/20; D06M 15/564; D06M 2200/12; C14C 11/006; C08L 75/14; C08L 33/10; C08L 75/04; C09K 3/18; C08F 220/36; C08F 220/20; B05D 1/02; B05D 1/18; B05D 1/28; B05D 2203/20; B05D 2203/22; B05D 2503/00; B05D 5/00
See application file for complete search history.

(56) References Cited

U.S. PATENT DOCUMENTS 3,896,251 A 7/1975 Landucci
4,098,701 A 7/1978 Burrill et al.
(Continued)

FOREIGN PATENT DOCUMENTS

DE 1001965 2/1957
DE 10 171 33 10/1957
(Continued)

OTHER PUBLICATIONS

Int'l Search Report (Form PCT/ISA/210) conducted in Int'l Appln. No. PCT/EP2017/066994 (dated Sep. 19, 2017).
(Continued)

Primary Examiner — William P Fletcher, III
(74) Attorney, Agent, or Firm — Greenblum & Bernstein, P.L.C.

(57) ABSTRACT

Preparations of a polyurethane and/or polyurea and a copolymer which are hydrophobic contain at least one conversion product (S), at least one copolymer (C), optionally at least one (blocked) polyisocyanate, optionally a solvent, and optionally at least one surface-active substance. The conversion product (S) may be the reaction product of at least one compound (A) with at least one unblocked or at least partially blocked di-, tri- or polyisocyanate (IC). The compound A may be the reaction product of a polyhydric alcohol with a carboxylic acid or with an alkylisocyanate, or a reaction product of an alkanolamine and/or alkylamine (a3) with a carboxylic acid and/or alkylisocyanate. The highly hydrophobic preparations may be applied to textiles without negatively influencing a subsequent adhesion of the textile substrate or the membrane permeability of the substrate even after thermal treatment, and exhibit very good wash permanence on the substrates.

37 Claims, No Drawings

(51) Int. Cl.
  *C08G 18/76* (2006.01)
  *C09D 133/06* (2006.01)
  *C09D 133/14* (2006.01)
  *C09D 175/12* (2006.01)
  *C14C 11/00* (2006.01)
  *D06M 15/564* (2006.01)
  *D21H 19/20* (2006.01)
  *D21H 19/30* (2006.01)
  *C09D 175/02* (2006.01)
  *C08G 18/28* (2006.01)
  *C08L 75/04* (2006.01)
  *C08G 18/10* (2006.01)
  *C09D 175/04* (2006.01)
  *C08G 18/32* (2006.01)
  *C08G 18/79* (2006.01)

(56) References Cited

U.S. PATENT DOCUMENTS

| | | | |
|---|---|---|---|
| 4,154,714 A | 5/1979 | Hockemeyer et al. | |
| 10,253,450 B2 | 4/2019 | Sielemann et al. | |
| 2005/0085573 A1* | 4/2005 | Sandner | C08G 18/3281 524/196 |
| 2010/0190397 A1 | 7/2010 | Duschek et al. | |
| 2012/0015575 A1 | 1/2012 | Fuchs et al. | |
| 2017/0130394 A1 | 5/2017 | Knaup et al. | |
| 2017/0158850 A1 | 6/2017 | Knaup et al. | |
| 2017/0204558 A1 | 7/2017 | Knaup et al. | |

FOREIGN PATENT DOCUMENTS

| | | |
|---|---|---|
| DE | 33 329 97 | 3/1985 |
| DE | 4441418 | 5/1996 |
| DE | 10017651 | 10/2001 |
| DE | 10211549 | 10/2003 |
| DE | 10 2007 020 790 | 11/2008 |
| DE | 10 2013 209 170 | 12/2013 |
| EP | 0159117 | 1/1993 |
| EP | 0448399131 | 8/1996 |
| EP | 1 424 433 | 11/2003 |
| JP | 2000248140 | 12/2000 |
| JP | 2016-121256 | 7/2016 |
| JP | 2017-504730 | 2/2017 |
| JP | 2017-222827 | 12/2017 |
| WO | 00/29663 | 5/2000 |
| WO | 2008/022985 | 2/2008 |
| WO | 2008/135208 | 11/2008 |
| WO | 2010/115496 | 10/2010 |
| WO | 2016/000830 | 1/2016 |
| WO | 2017/199726 | 11/2017 |

OTHER PUBLICATIONS

Int'l Prel. Exam. Rpt. (Form PCT/ISA/237) conducted in Int'l Appln. No. PCT/EP2017/066994 (dated Sep. 19, 2017).
German Search Report conducted in counterpart German Appln. No. 10 2016 212 443.9 (dated Mar. 6, 2017).
Siefken, "Mono- und Polyisocyanate, IV. Mitteilung über Polurethane," Justus Lievigs Annalen dr Chemie, vol. 562, No. 2, pp. 75-136 (1949).
Jul. 21, 2020 Office Action in patent family member Japanese Patent Application No. 2018-567844 and English translation thereof.
Machine English translation of JP2016-121256.
Machine English translation of JP2017222827A.
Machine English translation of JP2017504730A.

* cited by examiner

PREPARATIONS AS HYDROPHOBING AGENTS

FIELD OF THE INVENTION

The invention relates to preparations comprising a polyurethane and/or polyurea and a copolymer as well as their use as hydrophobing agents.

BACKGROUND OF THE INVENTION (1) Field of the Invention

For the hydrophobization or oleophobization of textiles, usually aqueous or solvent-containing preparations with silicone oils, paraffins, fatty acid salts, fatty acid modified melamine resins, fluorocarbon polymers and other additives are used. Textiles treated in this way are protected against rain, splashing water or moisture.

(2) Description of Related Art

While preparations based on paraffins, fatty acid salts, fatty acid modified melamine resins and silicones only have a water-repellent (hydrophobing) effect, preparations based on fluorocarbon polymers also have a dirt- and oil-repellent (oleophobing) effect. Fluorocarbon finishings are used both in the clothing and home textile sector and in the field of technical textiles.

Usually, preparations for oleophobization are based on polyurethanes or polyacrylates containing perfluoroalkyl groups of different chain lengths, often in combination with other additives. Suitable additives can be, for example, thermosetting resins based on methylol compounds which cause dimensional stability, fastness to washing and stiffness. In addition, extenders are also used as additives to improve the water- and oil-repellent effects of the fluorocarbon finishing and to increase wash permanence. Suitable extenders are for example fatty acid modified melamine resins, mixtures of wax and zirconium salts or blocked polyisocyanates. The preferred aqueous products are usually applied by the exhaust and padding process by spraying, foaming or padding.

However, preparations based on fluorocarbon polymers are expensive due to their energy-intensive production and are also suspected of being ecotoxic and toxic to humans, so that their use is viewed increasingly critically, especially in the clothing sector. At present, all efforts are heading towards providing preparations in which perfluorinated $C_8$ compounds are replaced by the less harmful $C_6$-based products. This adjustment will also be accelerated by the envisaged regulation of perfluorinated $C_8$ building blocks by the European Chemicals Agency ECHA.

WO 2008/022985 describes fluorocarbon polymers produced by copolymerizing short-chain $C_6$-perfluoroalkylethylmethacrylates, $C_{12}$-$C_{22}$-alkyl(meth)acrylates, vinyl(iden) chloride and other crosslinkable monomers.

In the public discussion, however, perfluorinated organic compounds are generally perceived in a negative way due to their persistence, so that alternative fluorine-free products with comparable property profiles are increasingly sought after.

Currently, only hydrophobic but no oleophobic effects can be achieved with fluorine-free preparations. Aqueous emulsions of paraffins, metal soaps and silicic acid salts of polyvalent metals are used to make the textile surface impermeable to rain or splashing water. Such preparations are also used to treat paper, to improve its hydrophobic properties. From DE 10 019 65 reaction products of basic metal salts of higher molecular weight fatty acids or resin acids and low molecular weight di- or polyisocyanates are known for hydrophobing textiles.

In addition to good initial hydrophobicity, the resistance of the finish to multiple washes is also an important point. For this reason, preparations were developed at an early stage to improve the inadequate resistance to washing processes. In DE 10 171 33 hydrophobing agents are described which are produced by mixing a condensation product of hexamethylolmelamine hexamethylether, stearic acid, stearic acid diglyceride and triethanolamine with paraffin. However, in the case of the fabrics and fiber materials treated with this substance, it has turned out to be disadvantageous that the relatively high application amount, the chemical character of the preparation and, in particular, the crosslinking of the fatty acid-modified methyloltriazine compound with itself and the functional groups of the substrate have resulted in a distinct hardening of the handle character. In addition, the formaldehyde content of products based on this chemistry is often critical, so that the corresponding products must be labelled accordingly. Textiles treated in this way often still have formaldehyde concentrations above the limits of textile standards such as Ökotex, Bluesign, etc.

Alternative methods for impregnating textiles by applying crosslinkable organopolysiloxanes are also known. Crosslinking can be achieved by condensing Si—H and Si—OH functional organopolysiloxanes with the aid of a catalyst, as described, for example, in U.S. Pat. No. 4,098,701. Crosslinking is also possible by addition of Si—H-functional organopolysiloxanes to SiC-bonded olefinic residues (cf. e.g. U.S. Pat. No. 4,154,714 and DE 33 329 97 A1). Due to the reactive character of organopolysiloxanes, however, it is difficult to produce storage-stable preparations. Often the components can only be mixed directly before use, which makes handling cumbersome in practice.

WO 00/29663 describes preparations for permanent fiber finishing containing conversion products of polyisocyanate-functional compounds with silicone-free and/or silicone-containing fabric softeners. All examples show a hydrophilic residue.

Fluorine-free hydrophobing agents based on highly branched polyurethanes and organopolysiloxanes are described in WO 2008/135208.

In DE 10 2013 209 170 preparations based on silicone polymers and waxes or fatty acid esters are used to achieve water-repellent effects on textile materials.

In the automotive textile sector, however, the use of organopolysiloxane-containing hydrophobing agents is undesirable. This is due to the fact that organopolysiloxanes strongly disturb the paintability of surfaces and can lead to undesired surface defects.

From DE 10 211 549 preparations are known which consist of a synthetic or natural wax component, a highly branched polyurethane and optionally a blocked polyisocyanate. The waxes may, for example, be bee waxes, carnauba waxes, polyethylene waxes or Fischer-Tropsch waxes.

WO 2010/115496 describes fluorine-free dispersions which consist of an acrylate copolymer and a paraffin and are used for hydrophobizing textiles. Long-chain $C_{12}$-$C_{22}$ alkyl (meth)acrylates, styrene or methyl styrene, vinyl (idene) chloride and optionally 2-chloro-3-hydroxypropyl (methacrylate) and/or glycidyl (meth)acrylate are used to build the copolymer.

WO 2016/000830 describes fluorine-free preparations consisting of a polyacrylate, a wax and optionally a blocked isocyanate and/or an organopolysiloxane and/or a melamine resin. The polyacrylates are based on long-chain $C_9$-$C_{40}$ alkyl (meth)acrylates, a $C_1$-$C_8$ alkyl (methacrylate) and a glycidyl or hydroxy functional monomer, In EP 1 424 433, mixtures of a paraffin wax emulsion and a polymer emulsion are used for hydrophobing nonwovens and textiles. The polymer is composed of vinyl esters of branched $C_8$-$C_{13}$ carboxylic acids, $C_2$-$C_{12}$ alkyl (meth)acrylates and other unsaturated comonomers.

JP 2000248140 describes preparations based on polyacrylates and paraffin waxes which are used for hydrophobizing paper.

However, the paraffins in the preparations described in DE 10 211 549, WO 2010/115496, WO 2016/000830, EP 1 424 433 and JP 2000248140 have a negative effect because they partially evaporate during drying and condensing on the textile substrate at higher temperatures (from 170° C.) and lead to undesired deposits in the dryer. Furthermore, it is very difficult to chemically crosslink unfunctionalized waxes, so that the wash permanence of this component is insufficient.

In recent years, water vapor permeable, breathable functional textiles have gained enormous importance. The textiles are designed in such a way that rain and wind cannot penetrate from the outside, but at the same time sweat in the form of water vapor can escape from the inside to the outside. In most cases, the functional textiles have a 2- or 3-layer structure. 2-layer laminates are produced with prefabricated membranes mainly by gluing to a corresponding outer fabric. In most cases, the adhesive is applied in a punctiform manner in order to cover as little surface area as possible. Alternatively, laminates can also be produced with a reverse coating. For this purpose, a release paper is coated with a solvent-containing polyurethane. The textile is then immediately brought into contact with the polymer film, which has not yet dried. After drying and condensing, the release paper is detached, and the finished laminate is obtained. Often the polymer film is first dried on the release paper and then attached to the textile using a second adhesive coating. Direct coatings with solvent-containing polyurethanes are another possibility to produce breathable functional textiles.

If hydrophobing agents contain low-molecular wax compounds with a low melt viscosity, such as paraffins, these can significantly impair the breathability of laminates in particular. This is due to the fact that many waxes migrate into the membrane in the molten state. Since temperatures of up to 180° C. occur during the production of the laminate, e.g. during bonding, coating or finishing, migration is to be expected. But even later in use, migration can occur during washing and drying at temperatures >70° C.

In DE 33 329 97 A1, WO 2008/135208 and DE 10 2013 209 170 organopolysiloxanes are used as hydrophobing components. Since organopolysiloxanes often have a strong separation effect, adhesion problems can occur with the technologies described above. This is noticeable by the fact that the membrane or coating separates from the outer fabric. This problem is exacerbated by frequent washing.

BRIEF SUMMARY OF THE INVENTION

It is therefore the object of the present invention to provide a fluorine-free preparation which, when applied to a substrate in small quantities, causes an optimum hydrophobization, but at the same time permits subsequent adhesion and does not influence the membrane function.

Surprisingly, the object could be achieved by providing a preparation which comprises at least one conversion product (S) (component (1)), at least one copolymer (C) (component (2)), optionally at least one (blocked) polyisocyanate (component (3)), optionally a solvent (component (4)) and optionally at least one surface-active substance (component (5)).

DETAILED DESCRIPTION OF THE INVENTION

The preparations are characterized by superior hydrophobing properties at low used quantities without negatively influencing a subsequent adhesion of the substrate. It has also been shown that the preparation does not negatively influence the membrane permeability of the substrate even after thermal treatment. Furthermore, the preparations according to the invention have very good wash permanence on substrates.

A first aspect of the present invention is therefore a preparation (Z) comprising
(1) at least one conversion product (S) obtainable by reacting at least one compound (A) of the formula

(AI)

and/or

(AII)

wherein $R^1$ is —X—Y—Z or —Z, preferably —X—Y—Z with $X=(CH_2)_{n''}-$, $Y=$

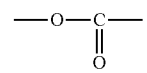

or,

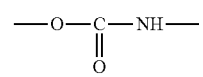

$Z=(CH_2)_m-CH_3$, $R^2$ is

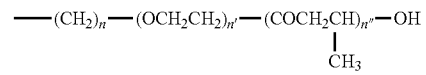

$R^3$ is —X—Y—Z, —Z or —Y—Z, with the provision that in the case of the meaning —Y—Z, n is replaced by n'' in the residue $R^2$, $R^4$ is —X—Y—Z or —(CH$_2$)$_n$·H $B^1$ is —V—W—Z or —Z, preferably —V—W—Z with $V=(CH_2)_{n''}-$ or $$-CH_2CH-,$$
$$\phantom{-CH_2}|$$
$$\phantom{-CH_2}CH_3$$

W=

$$-O-C-, \quad -N-C-, \quad -N\underset{\underset{}{\diagdown}}{\diagup}N$$
$$\phantom{-O-}\underset{O}{\|} \quad \phantom{-N-}\underset{H}{|}\underset{O}{\|}$$

$$-N-C-N-$$
$$\phantom{-}\underset{H}{|}\underset{O}{\|}\underset{H}{|}$$

or $$-O-C-N-,$$
$$\phantom{-O-}\underset{O}{\|}\phantom{-}\underset{H}{|}$$

$B^2$ is $$-(CH_2CH_2O)_{n'}-(CH_2CHO)_{n''}-H,$$
$$\phantom{-(CH_2CH_2O)_{n'}-(CH_2}|$$
$$\phantom{-(CH_2CH_2O)_{n'}-(CH_2}CH_3$$

or $-(CH_2)_{n'''}-NH_2$, $B^3$ is $-V-W-Z$, or $-Z$ or $$-C-Z,$$
$$\underset{O}{\|}$$

$B^4$ is $-V-W-Z$ or $$-C-Z,$$
$$\underset{O}{\|}$$

Q is $-(CH_2)_{n'''}-$ and n, n', n", n''' and m are each independently an integer, wherein n=0-2,
n'=0-4,
n"=1-4,
n'''=0-4 and
m=8-30, preferably 10-26, more preferably 10-22, with at least one unblocked or at least partially blocked di-, tri- or polyisocyanate (IC), wherein the proportion of free isocyanate (NCO) groups in the polyisocyanate (IC) is between 1.8 and 10 per mole, (2) at least one copolymer (C) comprising at least one building block of the formula (M(1))

wherein $L = -O-R^6, \quad -NH-R^6, \quad -O-\underset{\underset{}{\|}}{C(=O)}-NHR^6,$ $-O-CH_2(CH_2)_kO-\underset{\underset{}{\|}}{C(=O)}-NHR^6,$ $-NH-CH_2(CH_2)_kO-\underset{\underset{}{\|}}{C(=O)}-NHR^6,$ $-O-CH_2(CH_2)_kNH-\underset{\underset{}{\|}}{C(=O)}-NHR^6$ and/or $-O-CH_2(CH_2)_kNH-\underset{\underset{}{\|}}{C(=O)}-OR^6,$ (M(2))

and/or (M(3))

wherein
$R^5$ is $-H$ or $-CH_3$,
$R^6$ is a $C_{12}$-$C_{40}$ hydrocarbon residue,
$R^7$ is a linear or branched aliphatic $C_1$-$C_8$ hydrocarbon residue,
U is $-O-$ or $-NH-$,
$R^8$ is (epoxide), (CH(OH)CH_2Cl), (CH(OH)CH_2Br)

or $-CH_2-(CH_2)_p-OH$,
and k and p are each independently an integer with
k=1-5 and
p=0-10.

(3) optionally at least one unblocked or at least partially blocked di-, tri- or polyisocyanate (IC), (4) optionally water and/or at least one organic solvent and (5) optionally at least one surface-active substance.

All percentages of the preparations according to the invention refer to the total preparation and are weight percentages unless otherwise indicated.

Preferably the preparation (Z) according to the invention is free from fluorine compounds.

Component (1) is preferably a hydrophobic conversion product (S). The term "hydrophobic" within the meaning of the present invention defines compounds which typically do not essentially dissolve at 20° C. in water. Saturated solutions of "hydrophobic" compounds within the meaning of the present invention preferably contain up to 1 g of dissolved compound per liter of water (20° C.), more preferably up to 0.5 g/l, more preferably up to 0.2 g/l.

The conversion product (S) is obtainable by reacting at least one compound (A) with at least one unblocked or at least partially blocked di-, tri- or polyisocyanate (IC).

The compound (AI) is preferably obtained by reacting polyhydric alcohols (a1) with carboxylic acids (b1) or with alkylisocyanates (b2). Preferred examples of polyhydric alcohols (a1) are glycerol, trimethylolethane, trimethylolpropane, 1,2,4-butanetriol, pentaerythritol or sugar, such as glucose, preferably glycerol, trimethylolethane, trimethylolpropane, 1,2,4-butanetriol and/or pentaerythritol, more preferably glycerol.

The compound (AII) is preferably obtained by reacting alkanolamine (a2) and/or alkylamine (a3) with carboxylic acid (b1) and/or alkylisocyanate (b2). Preferred alkanolamines (a2) are 2-amino-2,3-propanediol, 2-amino-2-methyl-1,3-propanediol diethanolamine, dipropanolamine, diisopropanolamine, ethanolpropanolamine, triethanolamine, triisopropanolamine, N,N,N',N'tetrakis(2-hydroxypropyl)ethylenediamine, aminoethylethanolamine, aminopropylethanolamine, alkyltris(hydroxyethyl)propylenediamine and alkyldihydroxyethylamine, preferably having 12-24 carbon atoms in the alkyl residue, as well as their ethoxylation products. Particularly preferred are diethanolamine, diisopropanolamine triethanolamine, triisopropanolamine, aminoethylethanolamine and aminopropylethanolamine, more preferably triethanolamine.

Examples of alkylamines (a3) are his(aminoethyl)amine, bis(aminopropyl)amine and their polymeric homologues, aminoethylminopropylamine, bis(aminopropyl)ethylenediamine, tris(amino-ethyl)amine, tris(aminopropyl)amine, trisaminononane, aminopropylstearylamine and aminopropylbisstearylamine. Bis(aminoethyl)amine, bis(aminopropyl)amine, aminoethylaminopropylamine, bis(aminopropyl) ethylenediamine and aminopropylstearylamine are preferred, in particular bis(aminoethyl)amine.

The carboxylic acids (b1) used for the preparation of compound (A) may be saturated, unsaturated, unbranched or branched and preferably have 10-32 carbon atoms, more preferably 12-24 carbon atoms. Preferably unbranched, saturated carboxylic acids with preferably 10-32 carbon atoms, more preferably 12-24 carbon atoms, e.g. capric, undecanoic, lauric, myristic, palmitic, stearic, arachic and behenic acid are used. Lauric, palmitic, stearic and behenic acid are particularly preferred.

The alkyl isocyanates (b2) used for the preparation of compound (A) of formula (AI) and (AII) are preferably unbranched, the alkyl residue preferably having 9-31, in particular 11-23, carbon atoms. A particularly preferred alkyl isocyanate is stearyl isocyanate.

Instead of the compound (A) prepared using the polyhydric alcohols (a1) or the alkanolamines (a2) or the alkylamines (a3) and the carboxylic acids (b1) or the alkylisocyanates (b2), compounds with an active hydrogen atom and two hydrophobic residues such as Guerbet alcohols, bis(dodecyl)amine and preferably bis(octadecyl)amine may also be used.

At least one compound (A) is reacted with at least one unblocked or at least partially blocked di-, tri- or polyisocyanate (IC) to give the hydrophobic conversion product (S), the proportion of free isocyanate (NCO) groups in the polyisocyanate (IC) being between 1.8 and 10 per mole. Examples of unblocked or partially blocked isocyanates are described in DE 100 17 651, paragraphs [0032] to [0037].

Particularly preferred, unblocked di-, tri- or polyisocyanates (IC) are, for example, 2,4-toluylene diisocyanate, 2,4'-diphenylmethane diisocyanate, 4,4'-diphenylmethane diisocyanate (MDI), higher-chain homologues of the diphenylmethane diisocyanate (polymer MDI), 4-methylcyclohexane-1,3-diisocyanate, tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate, dimer diisocyanate, mixtures, such as e.g. mixtures of MDI and polymer MDI, and derivatives thereof. Dimer diisocyanate is available from Cognis Corp., 300 Brookside Avenue, Ambler, Pa. 19002, USA, under the designation DDI 1410.

Derivatives of isocyanates (IC) comprise, for example, cyclized oligo- or polyisocyanates. The preparation of cyclized oligo- or polyisocyanates can be performed according to the known methods of cyclization according to W. Siefken (Liebigs Annalen der Chemie 562, 1949, pages 75-136), wherein the oligo- or polyisocyanates may be open-chain or in cyclic form. Such derivatives may be prepared from the above-mentioned di-, tri- and polyisocyanates by linkage with urethane, allophanate, urea, biuret, uretdione amide, isocyanurate, carbodiimide, uretonimine, oxadiazinetrione or iminoxadiazinetrione structures.

It is also possible to derivatize subsets of the isocyanate groups with polyalkoxymonoalkyl ethers with the aid of appropriate catalyst systems to urethanes in order to improve the emulsifiability of component (1) in water. Polyethylene glycol monomethyl ethers with preferably 4-20 ethylene oxide units, optionally with additional 2-6 propylene oxide units can be used for this purpose. The systems known to the person skilled in the art based on tertiary amines and/or organostannic compounds such as dibutyltin dilaurate, dioctyltin dilaurate or diacetate can be used as catalysts.

Preferred derivatives are hexamethylene diisocyanate trimers, diphenylmethane diisocyanate trimers, urethanes from 2,4-toluylene diisocyanate with free NCO groups, and di-, tri- or polyisocyanate (IC) modified with polyalkoxymonoalkyl ether, in particular di-, tri- or polyisocyanate modified with polyethylene oxide monoalkyl ether.

As an alternative to the isocyanates modified by polyalkoxymonoalkyl ethers, tertiary alkanolamines can be used as additives to improve the cationic charge of the conversion products (S) and thus the self-emulsifying properties without impairing the overall properties. Dimethylaminoethanol is particularly suitable for this purpose.

Moreover, the isocyanate (IC) can be partially or completely blocked (see for example DE 100 17 651, paragraph [0042]). Preferred blocking agents are caprolactam, sodium bisulfite, methylethylketoxime, 3,5-dimethylpyrazole N-tert-butylbenzylamine, in particular caprolactam.

Blocking is effected by reacting di-, tri- or polyisocyanate (IC) with the blocking agent in the melt or in an organic solvent (SO) inert to isocyanates, preferably under a protective gas atmosphere and in the presence of a suitable catalyst, as described for example in EP 0 159 117 B1 or DE 44 41 418 A1. The molar ratio of the free NCO groups in the isocyanate (IC) to the isocyanate-reactive groups of the blocking agent is preferably in a stoichiometric excess, e.g. >1:1 to 2:1, more preferably up to 3:1. Anhydrous esters such as ethyl acetate, n-propylacetate, i-propylacetate, n-butyl acetate, i-butyl acetate or amylacetate are preferred as suitable inert organic solvents (SO).

To prepare the conversion product (S), the molar ratio of free isocyanate (NCO) groups in the polyisocyanate (IC) to isocyanate-reactive groups, in particular hydroxyl groups and/or primary amino groups, in compound (A) is adjusted to preferably 1:1 to 1:1.3, preferably 1 to 1.1.

Component (1) preferably accounts for 10-90 wt. %, preferably 20-80 wt. %, more preferably 25-65 wt. % or 1-30 wt. %, based on the total preparation (Z).

Component (2) is at least one copolymer (C) comprising at least one building block of formula

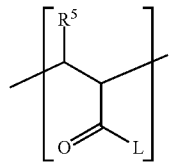
(M(1))

wherein

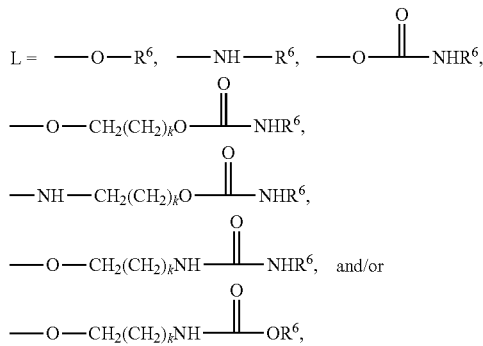

and/or

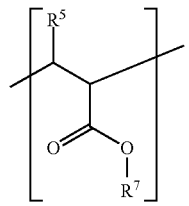
(M(2))

and/or

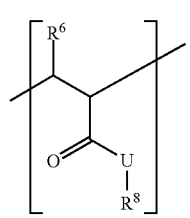
(M(3))

wherein
$R^5$ is —H or —CH$_3$,
$R^6$ is a $C_{12}$-$C_{40}$ hydrocarbon residue,
$R^7$ is a linear or branched aliphatic $C_1$-$C_8$ hydrocarbon residue,
U is —O— or —NH—,
$R^8$ is

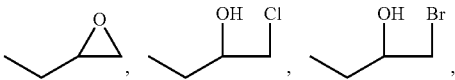

or —CH$_2$—(CH$_2$)$_p$—OH,
and k and p are each independently an integer with
k=1-5 and
p=0-10.

The building blocks are obtained by copolymerization of the corresponding monomers

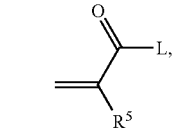
(M'(1))

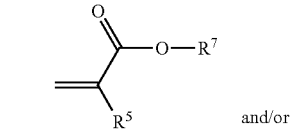
(M'(2))

and/or

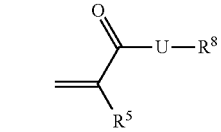
(M'(3))

wherein $R^5$, $R^7$, $R^8$, and L are defined as for M(1), M(2) and M(3).

Monomers M'(1), which by polymerization lead to a building block M(1), are preferably alkyl (meth)acrylate alkyl (meth)acrylamide or alkyl carbamate (meth)acrylate, wherein the alkyl residue is a $C_{12}$-$C_{40}$ hydrocarbon group residue ($R^6$). Alkyl (meth)acrylates or alkyl carbamate (meth)acrylates are particularly preferred. The $C_{12}$-$C_{40}$ hydrocarbon residue $R^6$ may be branched or unbranched, saturated or unsaturated and each comprises 12-40 carbon atoms. Preferred hydrocarbon residues R6 are selected from unbranched or branched dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl and triacosyl residues. Particularly preferred, $R^6$ is an unbranched dodecyl, tetradecyl, hexadecyl, octadecyl and docosyl residue. Particularly preferred, the building block M(1) is obtained by polymerization of alkyl (meth)acrylate with an unbranched dodecyl, tetradecyl, hexadecyl, octadecyl, cetyl or docosyl residue as alkyl residue.

The monomer M'(1) may also be an alkyl carbamate (meth)acrylate obtained from the reaction of a hydroxyalkyl (meth)acrylate with an alkylisocyanate, the alkyl residue being as defined above. Alkylcarbamate (meth)acrylates are also obtainable from the reaction of 3-isocyanatoethyl (meth)acrylate with corresponding fatty alcohols or fatty amines. The starting raw material for the synthesis of alkyl carbamate monomers is particularly preferably 2-hydroxyethyl methacrylate or 2-hydroxyethyl acrylate, which is converted with the alkyl isocyanate. The synthesis can be carried out in substance as well as in solvent at temperatures between 40-90° C. The systems known to the person skilled in the art based on tertiary amines and/or organostannic compounds such as dibutyltin dilaurate, dioctyltin dilaurate or diacetate can be used as catalysts. The reaction can be monitored titrimetrically or by IR spectroscopy.

In a preferred embodiment, component (2) comprises 30-90 mol %, preferably 40-85 mol %, more preferably 50-80 mol % of building block M(1).

Monomers which lead to a building block M(2) are preferably alkyl(meth)acrylates, the alkyl residue being a $C_1$-$C_8$ hydrocarbon residue ($R^7$). Particularly preferred M'(2) is n-butyl (meth)acrylate, tert-butyl methacrylate, isobutyl methacrylate, and 2-ethylhexyl methacrylate.

In a preferred embodiment, component (2) comprises 5-65 mol %, preferably 10-55 mol %, more preferably 16-49 mol %, of building block M(2).

Monomers which lead to a building block M(3) are preferably (meth)acrylates or (meth)acrylamides, preferably (meth)acrylates, having a hydroxy or epoxy group. Preferred monomers M(3) are glycidyl methacrylate and 2-hydroxyethyl methacrylate.

In a preferred embodiment, component (2) comprises 0.1-8 mol %, preferably 0.5-5 mol %, more preferably 1-4 mol % of building block M(3).

In a preferred embodiment, component (2) comprises building block M(1), building block M(2) and building block M(3).

In a preferred embodiment, component (2) comprises 30-90 mol % of the building block M(1), 5-65 mol % of the building block M(2) and 0.1-5 mol % of the building block M(3).

In a preferred embodiment, component (2) does not comprise building blocks formed by polymerization of styrene, methylstyrene, vinylidene chloride and/or vinyl chloride.

The copolymer (C) (component (2)) can be prepared in organic solvents by radical polymerization. For this purpose, the monomers M'(1), M'(2), M'(3) are dissolved in the solvent and the polymerization is started under inert gas with the aid of a radical initiator at temperatures between 50-90° C. As solvents e.g. aliphatic and aromatic hydrocarbons, esters, ketones and ethers can be used. Preferably, aliphatic hydrocarbons, methyl ethyl ketone, methyl propyl ketone, ethyl acetate, isopropyl acetate, butyl acetate and tetrahydrofuran are used. Particularly preferred are aliphatic hydrocarbons and isoproyl acetate.

Common radical initiators are azo compounds such as azobisisobutyronitrile and azobisvaleronitrile, hydroperoxides such as cumene hydroperoxide and tert-butyl hydroperoxide, dialkyl peroxides such as di-tent-butyl peroxide and dicumol peroxide and peroxyesters such as tert-butyl perbenzoate, and diacyl peroxides such as benzoyl peroxide and lauroyl peroxide.

The copolymer (C) is preferably produced by emulsion polymerization. The monomers, water, surface-active substances (surfactants) and optionally further solvents such as alcohols (e.g. ethanol, isopropanol, butyl diglycol, propylene glycol, dipropylene glycol, tripropylene glycol), ethers (e.g. dipropylene monomethyl ether, tripropylene glycol monomethyl ether, dipropylene glycol monobutyl ether, dipropylene glycol dimethyl ether) and esters (such as propylene glycol monomethyl ether acetate), are mixed to form a pre-emulsion. If necessary, this can be further treated with suitable mechanical aids such as stirrer, Ultra-Turrax, dissolver disc, high-pressure homogenizers, ultrasonic homogenizer or other dispersion methods known to the person skilled in the art.

Polymerization is then usually initiated using inert gas at a temperature of 40-90° C. with stirring with a radical initiator such as azo compounds, e.g. azobisisobutyronitrile, azobisvaleronitrile, 2,2'-azobis(2-amidinopropane) dihydrochloride, and 2,2'-azobis[2-(2-imidazolin-2-yl)propane]dihydrochloride, hydroperoxides, e.g., cumene hydroperoxide and tert-butyl hydroperoxide, dialkyl peroxide such as di-tert-butyl peroxide and dicumene peroxide, peroxyesters such as tert-butyl perbenzoate, diacyl peroxides such as benzoyl peroxide and lauroyl peroxide, inorganic peroxides such as ammonium persulfate and potassium persulfate or a combination thereof.

Further, chain regulators such as alkylthiols can be used to control the chain length of the copolymers. The solids content of the polymer suspension after complete polymerization is between 15-40 wt. % relative to the total mass.

Nonionic, anionic and/or cationic surfactants or mixtures thereof are used as surface-active substances (surfactants). Preferred non-ionic surfactants are e.g. alkoxylation products of fatty acids, fatty acid esters, fatty acid amides, aliphatic alcohols, sugar derivatives. Ethoxylation products of linear or branched aliphatic alcohols with 6 to 22 carbon atoms, which are used alone or in a mixture, are preferred. Cocamidopropyl betaine can be used as an amphoteric surfactant. Examples of cationic surfactants are quaternary ammonium salts, e.g. di-($C_{10}$-$C_{24}$)-alkyldimethylammonium chloride, ($C_{10}$-$C_{24}$)-alkyldimethylethylammonium chloride or bromide, ($C_{10}$-$C_{24}$)-alkyldimethylethylammonium chloride or bromide, ($C_{10}$-$C_{24}$)-alkyldimenthylbenzylammonium chloride, alkylmethylpolyoxyethyleneammonium chloride, bromide or monoalkylsulfate, salts of primary, secondary and tertiary fatty amines having 8 to 24 carbon atoms with organic or inorganic acids, salts of ethoxylated primary and secondary fatty amines having 8 to 24 carbon atoms with organic or inorganic acids, imidazolinium derivatives or esterquats. Di-($C_{10}$-$C_{24}$)-alkyldimethylammonium chloride, ($C_{10}$-$C_{24}$)-alkyltrimethylammonium chloride or bromide, salts of primary, secondary and tertiary fatty amines with 8 to 24 C-atoms with organic or inorganic acids and esterquats are preferably used. Examples of anionic surfactants are fatty alcohol sulphates such as sodium lauryl sulphate, alkyl sulphonates such as sodium dodecylbenzene sulphonate and fatty acid salts such as sodium stearate.

In a preferred embodiment, component (2) (i.e. the pure copolymer) makes up 10-90% by weight, preferably 20-80% by weight, more preferably 30-70% by weight or 5-30% by weight, based on the total preparation (Z).

The addition of component (3) is optional. The unblocked or at least partially blocked di-, tri- or polyisocyanates (IC) described above are preferably used as component (3). Compounds of component (3) are also referred to as boosters and have water-repellent properties. At the same time, due to the polyfunctionality of the isocyanate (IC), cross-linking is caused between the functional groups present on most substrates (e.g., —OH, —COOH or —$NH_2$ groups) and the unreacted functional groups of component (1) (e.g. —OH, —COOH or —$NH_2$ groups), which can significantly improve resistance to washing processes and increase resistance to abrasion.

Component (3) can be used both in unblocked and at least partially blocked form. When using the unblocked or partially blocked forms of component (3), premature reaction of the free NCO groups with the reactive active hydrogen atoms of the application medium must be minimized or avoided when used in protic solvents or water. This means that the unblocked or partially blocked polyisocyanates only have a limited pot life in these application media.

If the component (3) is to be applied from application media to fabrics which carry active hydrogen atoms, complete protection of the reactive NCO groups by blocking with suitable blocking agents is often necessary. Preferred blocked isocyanate (IC) is already described above. In order to achieve complete blocking, a small stoichiometric excess of blocking agent is usually used. If products are to be manufactured for aqueous applications, the blocked di-, tri- or polyisocyanates, if necessary dissolved in organic solvents, must be emulsified using suitable surface-active substances (surfactants).

In a particular embodiment, derivatives of di-, tri- or polyisocyanates (component (3)) whose self-emulsifying capacity in water is improved may also be used as boosters. Preferably, di-, tri- or polyisocyanate. (IC) modified with polyalkoxymonoalkyl ether, in particular di-, tri- or polyisocyanate (IC) modified with polyethylene oxide monoalkyl ether (see above) is used as component (3). These derivatives spontaneously form fine-particle emulsions with high stability and good compatibility with the other components of the preparation when added to water.

Preferably 0-50% by weight, preferably 1-35% by weight, more preferably 5-35% by weight, more preferably 5-25% by weight, even more preferably 5-15% by weight of component (3) based on the total preparation is used. Component (3) can also be used directly from solvent-containing, anhydrous media without any formulation aids.

The preparation according to the invention may further contain water and/or at least one organic solvent. Preferably, the component (4) is water or a mixture of water and at least one organic solvent. Preferred organic solvents are selected from the group consisting of esters, e,g. ethyl acetate, n-propylacetate, isopropylacetate, n-butyl acetate, isobutyl acetate or amylacetate, ketones, e.g. acetone or methyl ethyl ketone, and saturated hydrocarbons, e,g, n-hexane, n-heptane or n-octane.

Component (4) may be added separately or incorporated into the preparation together with components (1), (2), (3) and/or (5). The individual components (1), (2) and optionally (3) and (5) are preferably prepared separately, using component (4), as a solution or suspension, e.g. dispersion or emulsion, more preferably emulsion, more preferably oil-in-water emulsion, and then formulated to the preparation according to the invention.

In a preferred embodiment, component (4) accounts for 20-99.9% by weight, preferably 40-99.8% by weight, more preferably 50-99% by weight relative to the total preparation (Z).

The preparation (Z) according to the invention may further comprise at least one surface-active substance. The surface-active substance is preferably a surfactant. Component (5) shall be used in particular if the preparation is in the form of a suspension, in particular a dispersion or an emulsion. The surfactants ensure as homogeneous a distribution of the phases as possible, in particular the oil phase in the aqueous phase. In particular, non-ionic, cationic or anionic surfactants are used as surface-active substances.

Preferred non-ionic, anionic or cationic surfactants are described above.

Component (5) may be added separately or incorporated into the preparation together with components (1), (2), (3) and/or (4). The individual components (1), (2) and optionally (3) are preferably prepared separately, using component (5), as a solution or suspension, e.g. dispersion or emulsion, more preferably emulsion, more preferably oil-in-water emulsion, and then formulated to the preparation according to the invention.

The usual application quantities of component (5) are preferably 0-20% by weight, preferably 1-20% by weight, more preferably 2-15% by weight, based on the total quantity of components (1), (2), optionally (3) and/or optionally (5).

The preparation (Z) according to the invention may further comprise at least one conversion product (CDI). The conversion product (CDI) is preferably obtained by the following steps
a) Providing at least one di-, tri- or polyisocyanate (IC),
b) Reacting (IC) with at least one organic compound (O) which contains at least one isocyanate-reactive group, wherein the molar ratio of isocyanate groups to isocyanate-reactive groups is adjusted to 10:1 to 3:2, preferably 4:1 to 2:1, and
c) Carbodiimidizing the products present after step b) with a catalyst at temperatures of 25-150° C., preferably 40-100° C.

Alternatively, the conversion product (CDI) can be obtained by the following steps
a) Providing at least one di-, tri- or polyisocyanate (IC),
b) Carbodiimizing of (IC) with a catalyst at temperatures of 25-150° C., preferably of 40-100° C.; and
c) Reacting the products present after step b) with at least one organic compound (O) which contains at least one isocyanate-reactive group, wherein the molar ratio of isocyanate groups to isocyanate-reactive groups is adjusted to a ratio of 1.1.

Preferably the organic compound (O) is selected from the group consisting of monoamine, monoalcohol, diamine, diol, polyamine and polyol, preferably monoamine, monoalcohol, diamine and diol. Especially preferred is the organic compound (O) selected from the group consisting of
$R^9$—OH,
$R^9$—$NH_2$,
HO—$R^{10}$—OH and
$H_2N$—$R^{10}$—$NH_2$, wherein
$R^9$ is a saturated or unsaturated hydrocarbon residue having 12-40 carbon atoms, which may optionally contain at least one group selected from —CO—O—, —CO—, —CO—NH— and —O— and is optionally substituted with at least one polyalkylene oxide, cationic, anionic and/or amphoteric group, and
$R^{10}$ is a saturated or unsaturated hydrocarbon residue having 12-40 carbon atoms which may optionally contain at least one group selected from —CO—O—, —CO—, —CO—NH— and —O— and is optionally substituted with at least one polyalkylene oxide, cationic, anionic and/or amphoteric group.

The cationic group may be selected from an amonium group The anionic group may be selected from a carboxylate, sulfonate and/or phosphate group. The amphoteric group is preferably selected from a betaine and/or sulfo betaine. In a preferred embodiment, the monoalcohol is selected from cetyl alcohol, stearyl alcohol, behenyl alcohol, glycerol distearate, glycerol dibehenate, pentaerythritol tristearate, sorbitan tristearate, triethanolamine distearate and mixtures thereof. Preferred monoamines are stearylamine, distearylamine, conversion products of diethanolamine with fatty acids and mixtures thereof. Suitable diamines are e.g. dimer fatty acid diamines. Suitable diols are, for example, dimer fatty acid diols.

Preferably, carbodiimidization occurs in a catalytic way. Catalysts are known to the person skilled in the art and can be selected from phosphorene oxides, in particular 3-methyl-1-phenyl-2-phospholenoxide, 1-methyl-3-phospholenoxide, 1-methyl-2-phospholenoxide, 1,3-dimethyl-2-phospholenoxide and 1,3-dimethyl-3-phospholenoxide, and mercury compounds.

Carbodiimidization is usually carried out at temperatures of 25-150° C., preferably 40-100° C., more preferably 50-80° C. The catalyst is preferably used with 0.1-1 mol % based on the isocyanate groups present during carbodiimidization.

In a preferred embodiment, the content of the conversion product (CDI) is preferably 0-50% by weight, preferably 1-50% by weight, more preferably 5-35% by weight, even more preferably 5-15% by weight relative to the total preparation. The conversion product (CDI) can optionally be dissolved or dispersed in water and/or at least one organic solvent as described above, in this case, surface-active substances (surfactants)—as described herein—can also be used. The conversion product (CDI) may be added separately or incorporated into the preparation together with components (1), (2) and/or optionally (3) and/or optionally (4) and/or optionally (5).

The conversion product (CDI) may also be used directly from solvent-containing anhydrous media and without any formulation aids.

Preferably, the preparation according to the invention does not comprise a wax component.

The preparation (Z) according to the invention is preferably in the form of a suspension, preferably a dispersion or emulsion; or in the form of a solution. The preparation is preferably an emulsion (at 20° C.) or dispersion (at 20° C.). In these cases, the solids content of the preparation (Z) (components (1)+(2)+optionally (3)+optionally (5)) is preferably 20-99% by weight, preferably 15-35% by weight relative to the total preparation.

Optionally additional solubilizing agents such as ethylene glycol, propylene glycol, dipropylene glycol, dipropylene glycol monomethyl ether, mono- or diethylene glycol monobutyl ether or N-methypyrrolidone may be used. Emulsification can be carried out with the aid of high-pressure homogenizing machines.

For the preparation of the suspension the known methods for the formation of secondary emulsions are used. Usually the emulsification temperature is above the melting range of the active substances of components (1), (2) and optionally (3) used, preferably between 50 and 80° C. In order to produce the finest possible, particularly stable emulsions, a coarse pre-emulsion is often first produced, the particles of which are then reduced to the required average particle size between 0.1 and 10 micrometers with the aid of high-pressure homogenizers.

Optionally the component (4), in particular organic solvents, can be removed at least partially after the preparation of the suspension or solution, e.g. by distillation.

Usually, components (1), (2) and optionally (3) are prepared separately, where applicable using components (4) and/or (5) as suspension or solution and subsequently formulated to preparation (Z).

The invention further relates to the use of the preparation according to the invention as a hydraphobing agent, in particular as a hydrophobing agent on fabrics or fibers, such as textile substrates, paper, leather and mineral fabrics, or linear textiles, such as yarns, twists or ropes. The preparation is preferably applied to the fabrics for hydrophobization with coatings of 0.5-5 wt. %, preferably 0.5-3 wt. % solid substance based on the weight of the fabric to be treated.

"Fibers" in context of the present invention are natural fibers and synthetic fibers. Natural fibers are preferably cotton, wool or silk. Synthetic fibers or artificial fibers are produced synthetically from natural or synthetic polymers and are preferably made of polyester, polyolefin, preferably polyethylene or polypropylene, more preferably polypropylene, polyamide, polyaramide, such as Kevlar® and Nomex®, polyacrylonitrile, elastane or viscose.

A textile in the context of the invention is made of several fibers. The textile is preferably linear or flat. "Linear textile" means, for example, a yarn, a twist or a rope. "Flat textiles" are preferably non-wovens, felts, woven fabrics, knitted fabrics and braids. According to the invention, textiles can also contain blends of natural fibers and synthetic fibers.

Particularly preferred are fabrics made of textile substrates, such as woven fabrics, knitted fabrics, pre-strengthened fiber fleeces (nonwovens) The textile substrates can be made of native fibers, e.g., wool or cotton, or of synthetic fibers, e.g. PES-PA, and regenerated fibers and mixtures thereof.

When used on textile fabrics, the preparations according to the invention can also be combined with the textile auxiliaries commonly used in the textile industry. Special mention should be made of agents which improve the wrinkle release properties, such as methylol compounds of dihydroxyethylene urea or methylol melamine ethers of varying degrees of methylolation. Furthermore, textile auxiliaries that improve flame resistance or give the textile fabric a preferred handle can also be considered. However, the desired items handle can be achieved only by the combination of components (1) to (3) according to the invention, which is why further textile auxiliaries can be dispensed with in these cases.

The fabrics can also be made of paper, which can be produced according to the known papermaking methods and from all basic materials customary in this field of application. The preparations according to the invention may be applied either as an additive to the paper stock or by application to the surface of the machine-smooth paper by means of coating systems using roller, squeegee or air brush coating processes and subsequent infrared, hot-air or cylinder drying.

Leather fabrics are also well suited for the finish with the preparations according to the invention. If the application takes place in the finishing processes downstream of the tannery, this can be done with the known application methods or by spraying or impregnating.

The treatment of other textile fabrics is also possible. For example, mineral fabrics, such as non-stained tiles, ceramic parts or wall surfaces, can be given excellent water repellency by dipping into the finishing liquor according to the invention.

In another embodiment the preparation (Z) according to the invention can be used as an additive for hydrophobizing in paints, varnishes or plasters. In this case, the proportion of the preparation according to the invention is usually 1 to 10% by weight of the solid substance of the preparation according to the invention relative to the total composition.

Another aspect of the present invention is a method for the hydrophobization of substrates, in particular fabrics as described above, by applying the preparation (Z) according to the invention to a substrate. The application is carried out by the methods known to the person skilled in the art, for example by spraying, dipping, impregnating, painting or sponge application. In the case of textile substrates, the preparation may be applied by forced application or by exhaust methods. Usually a liquor in the desired concentration is provided in the forced application and applied to the padder by means of a forced application of aqueous medium with liquor absorption of 40-100%.

The method according to the invention further comprises preferably an after-treatment step, in particular for drying. Preferably the substrate which has been finished with the preparation (Z) is first pre-dried at about 80-110° C., more preferably 90-100° C. and then treated at about 30-170° C., preferably 140-160° C. for preferably 1-5 minutes, more preferably 1-4 minutes. The duration of the heat treatment depends in each case on the temperatures applied.

Many ready-made articles are either washed at home in household washing machines or in industrial washing machines or subjected to dry cleaning. Garments that have been treated to be oil, water and dirt repellent suffer a loss of these properties as a result of washing or cleaning. These properties can be refreshed and revitalized by an aftertreatment of the washed textile substrates with the preparation according to the invention according to the methods described above. Preferably, the method is therefore also used with regards to textile substrates that have already been washed (several times).

The washed textile substrates are treated in the washing or centrifugal drum by pouring a liquor of the preparations according to the invention onto the centrifugal-moist washing items and then drying them in the tumbler.

EXAMPLES

Fabric Finishing, Water Repellency

The following examples explain the invention. The finishes were applied to textile fabrics on a type LFV 350/2 "RFA" (Benz, Switzerland) laboratory padder with subsequent drying and hot treatment on a type TKF 15/M 350 (Benz, Switzerland) laboratory tensioning frame. The liquor absorption was determined by weighing out the finished test samples before and after application.

The modified substrates were tested in a standard climate (20° C., 65% relative humidity) 24 hours after conditioning. The coating quantities and the conditions of the hot treatment are listed in Tables 3a and 3b.

The water repellency was tested on the textile fabrics both by spray test according to the AATCC Standard Test Method 22 and by the much more differentiated "Bundesmann test" according to DIN 53 888. The test according to the AATCC Standard Test Method 22 is performed by spraying distilled water under controlled conditions onto the textile substrate to be tested and then visually comparing the wetting pattern to images of an evaluation standard listed in the test method. The numerical values specified refer to the appearance of the surface after water spraying and have the following meanings:
100=no water droplets adhering or wetting of the upper surface
90=isolated adherence of water droplets or wetting of the upper surface
80=wetting of the upper surface at the water impact points
70=Partial wetting of the entire upper surface
50=Complete wetting of the entire upper surface
0=Complete wetting of the entire upper and lower surface (wetting through).

In the "Bundesmann test" according to DIN 53 888, the textile substrate to be tested is exposed to the effect of a defined artificial rain and the amount of water absorbed after a certain period is determined as a percentage (marked as "water absorption" in Tables 3a and 3b). Furthermore, the water beading effect designated as "beading effect" in Tables 3a and 3b is used for the evaluation. This is evaluated by visual comparison of the irrigated test samples with images listed in the DIN standard according to 5 grades, which are designated as follows:
Grade 5=small droplets roll off vividly
Grade 4=formation of larger droplets
Grade 3=droplets get stuck on the test sample in places
Grade 2=test sample partially wetted
Grade 1=test sample is wetted or perfused over the entire surface.

The test samples were washed at 60° C. and dried in accordance with EN ISO 6330:2000 in order to test the resistance of the finished textile fabrics to washing processes.

Determination of Breathability, Migration Test

A laminate consisting of an untreated polyester outer fabric and a breathable Sympatex membrane is finished with the preparation according to the invention. The preparation is applied to one side of the stretched laminate using pump spray on the polyester outer fabric. The application and coating quantities can be found in Table 3c.

Water vapor permeability is measured in accordance with JIS L 1099 Method B2. A laminate finished with the hydrophobing agent is stretched over a cup filled with potassium acetate. This is placed bottom-up with the stretched side on a wet fleece and the amount of water absorbed by the hygroscopic salt through the membrane is measured. Thus, the breathability value in $g/24\ h/m^2$ is obtained.

Thermal Storage Test—Migration Test

The treated laminates (Table 3c) are stored in the oven at 60° C. for one week. The breathability is then determined, and the loss of breathability as compared to the original values is calculated as a percentage (%). The aim is to minimize the loss as far as possible.

Delamination—Adhesion

PES fabric samples finished with the padding process Table 4 are laminated together with the corresponding adhesive nonwoven in a sandwich-like manner. For this purpose, the adhesive nonwoven is laid between 2 finished fabric samples and the structure is pressed with a thermal printing press from the company Wagner (model: Motifprint Printstar) for 30 seconds at a pressure of 2.5 bar at 135° C. To test adhesion, test specimens measuring 30×5 cm are then punched out. The adhesion is measured analogous to DIN 54310 with a Zwick testing machine. The value is given as the separating force. The higher the separating force, the higher the adhesion.

The following commercially available products were used:
Ruco-Guard WEB: Solids content: 25%, aqueous emulsion of a butanone oxime blocked aromatic polyisocyanate; Rudolf GmbH
Ruco-Guard AFB6 conc.: Solids content: 27%, aqueous emulsion of an oleophobing and hydrophobing agent based on a fluorocarbon polymer containing 2-perfluorohexypethyl methacrylate, Rudolf GmbH
Freepell 1225: Solids content: 25%, aqueous emulsion of a paraffin wax and a fatty acid-modified melamine resin, Emerald Performance Materials
Phobotex APK: Solids content: 25%, aqueous emulsion of a paraffin wax and a fatty acid aluminium salt, Huntsman
Xiameter MEM-0075: Solids content: 60%, aqueous emulsion of a reactive methylhydrogen polysiloxane, Xiameter Lutensol ON 110: Isodecanol 11 EO; BASF
Arquad 2C75: Dicocosdimethylammonium chloride, Akzo Nobel
Ethoquat HT25: Stearyl-N,N-polyoxyethylene methylammonium chloride, Akzo Nobel Examples for the Production of Component (1)

Compound (A)

General Manufacturing Instruction for Compounds (A) of Formula (AI) and/or (AII)

The starting materials (a1, a2 or a3) and (b1) listed in Table 1 are melted under inert gas and stirring in the quantities in grams listed in Table 1 in a suitably dimensioned three-neck flask equipped with distillation cooler, controllable stirrer and internal thermometer. The mixture is then heated to the final temperature (T) specified in Table 1 and stirred until no more conversion water is distilled off and the acid number (AN) specified in Table 1 is reached. If necessary, 0.1% sulphuric acid can be added as a catalyst in the esterification reactions. The amidation reactions do not require the addition of a catalyst. The resulting condensation product is poured out and after cooling processed into flakes.

Compound (A)

Special Manufacturing Instructions for Compounds (A) of Formula (AI) and/or (AII) Using Alkyl Isocyanates (b2) and Further Processing to Conversion Product (S)

The compounds (a1) and (b2) listed in Table 1 in grams are presented in isopropyl acetate (solvent (SO)) in a suitably dimensioned three-necked flask equipped with reflux cooler, adjustable stirrer, internal thermometer and dropping funnel. Then 0.05% 1,4-diazabicylo(2,2,2)octane as catalyst, based on the total amount of components, is added and the mixture is stirred at 80° C. until no more NCO band is visible in the IR spectrum. Then the amount in grams of component (IC) specified in Table 1 is added to the mixture to prepare the conversion product (S) and stirring is continued at 80° C. until no more NCO band is visible in the IR spectrum.

Conversion Products (S) (=component (1)):

General Manufacturing Instruction for Conversion Products (S) From a Compound (A) and Unblocked or Partially Blocked Di-, Tri- or Polyisocyanates (IC)

The compounds (A) and the components (IC) listed in Table 1 are presented in isopropyl acetate (SO) in the quantities in grams listed in Table 1 in a suitably dimensioned three-necked flask equipped with reflux condenser, adjustable stirrer, internal thermometer and dropping funnel. Then 0.05% 1,4-diazabicylo(2,2,2)octane as catalyst, based on the total amount of components, is added and the mixture is stirred at 65° C. until no more NCO band is visible in the IR spectrum.

Special Manufacturing Instruction for the Conversion Products (S) (=component 1) Used in Emulsions (E) 3 and 8

A conversion product (S) is used to prepare the emulsions (E) 3 in accordance with Table 1, during the preparation of which (conversion of component (A) with the isocyanate (IC)) the quantity in grams of dimethylaminoethanol indicated in Table 1 is added. A conversion product (S) is used to prepare the emulsions (E) 8 in accordance with Table 1, during the preparation of which (conversion of component (A) with the isocyanate (IC)) the quantity in grams of bisoctadecylamine indicated in Table 1 is added.

Emulsions (E):

General Manufacturing Instruction for Emulsions (E) from the Conversion Products (S) (=component (1))

Oily phase: In a suitably sized beaker, the quantities in grams of conversion product (S) given in Table 1, present in the above isopropyl acetate, are presented and heated to 65-70° C. while stirring until a clear homogeneous solution is obtained. The conversion product (S) to be used may have to be melted at 65-70° C. before use to obtain a homogeneous product.

Aquoous phase: In a suitably dimensioned beaker the quantities in grams of component (5) given in Table 1 are dissolved in the indicated quantity of water at 65° C. Both phases are stirred under a high-speed stirrer to form a coarse pre-emulsion and then homogenized at 65° C. in a high-pressure homogenizing machine at 300-500 bar until an average particle size of between 0.1 and 10 micrometers is achieved. The solvent (SO) is then removed by azeotropic distillation on the rotary evaporator in a vacuum. If necessary, the pH value of the emulsion obtained is adjusted to 5-7 with 60% acetic acid, the white emulsion obtained is filtered through a 20-micrometer filter and adjusted to a solids content of 25% with water.

Examples for the Production of Component (2)

Acrylic acid 2-[[(octadecylamine)carbonyl]oxy]ethyl ester is produced analogously to example 2 in EP0448399B1.

Copolymer Emulsion (CE(2)

62.7 g (0.150 mol) acrylic acid 2-[[(octadecylamine)carbonyl]oxy]ethyl ester, 11.1 g (0.078 mol) isobutyl methacrylate and 1.5 g (0.015 mol) glycidyl methacrylate are mixed together with 20 g dipropylene glycol and heated to 80° C. In parallel, a solution of 0.25 g Ethoquad HT 25, 1.0 g Arquad 2C75 and 7.7 g Lutensol ON 110 in 145 g water is prepared at 80° C. in a separate vessel. The aqueous and the organic phase are then mixed with an Ultra-Turrax under strong stirring and then homogenized with an ultrasonic homogenizer for 3 min until a finely divided emulsion is formed. The pre-emulsion is transferred to a three-necked flask. After repeated inerting with nitrogen, 0.18 g lauryl mercaptan is added to the pre-emulsion. Polymerization is started by adding 1.05 g 2,2'-azobis[2-(2-imidazolin-2-yl)propane)dihydrochloride at about 80° C. Stir for a further 4 h at 80° C. to obtain a white emulsion with a solids content of approx. 32%.

Molar ratio in mol [%]: Monomer M'(1): Monomer M'(2): Monomer M'(3)=e.g. 63:32:5

Copolymer Emulsion (CE(2))

265.2 g (0.75 mol) stearyl methacrylate, 29.5 g (0.21 mol) tert-butyl methacrylate and 2.63 g (0.012 mol) glycidyl methacrylate and 2.63 g (0.02 mol) 2-hydroxyethyl methacrylate are mixed with 79.5 g dipropylene glycol and heated to 60° C. In parallel, a solution of 1.0 g Ethoquad HT 25, 4.0 g Arquad 2C75 and 30.8 g Lutensol ON 110 in 600 g water is prepared at 60° C. in a separate vessel. The aqueous and the organic phase are then mixed with an Ultra-Turrax under strong stirring and then homogenized with an ultrasonic homogenizer for 3 min until a finely divided emulsion is formed. The pre-emulsion is transferred to a three-necked flask. After repeated inerting with nitrogen, 0.72 g lauryl mercaptan is added to the pre-emulsion. Polymerization is started by adding 4.2 g 2,2'-azobis(2-amidinopropane) dihydrochloride at approx. 60° C. Stir for a further 4 h at 60° C. to obtain a white emulsion with a solids content of approx. 32%.

Molar ratio in mol [%]: Monomer M'(1): Monomer M'(2): Monomer M'(3)=e.g. 76:21:3

Copolymer Emulsion (CE(3))

275.0 g (0.67 mol) behenyl methacrylate, 19.0 g (0.096 mol) 2-ethylhexyl methacrylate and 2.63 g (0.012 mol) glycidyl methacrylate are mixed together with 79.5 g dipropylene glycol and heated to 60° C. In parallel, a solution of 5.0 g Ethoquad HT 25 and 30.8 g Lutensol ON 110 in 600 g water is prepared at 60° C. in a separate vessel. The aqueous and the organic phase are then mixed with an Ultra-Turrax under strong stirring and then homogenized with an ultrasonic homogenizer for 3 min until a finely divided emulsion is formed. The pre-emulsion is transferred to a three-necked flask. After repeated inerting with nitrogen, 0.72 g lauryl mercaptan is added to the pre-evulsion. Polymerization is started by adding 4.2 g 2.2'-azobis(2-amidinopropane) dihydrochloride at approx. 60° C. Stir for a further 4 h at 60° C. to obtain a white emulsion with a solids content of approx. 32%.

Molar ratio in mol [%]: Monomer M'(1): Monomer M'(2): Monomer M'(3)=e.g. 86:12:2

Copolymer Emulsion (CE(4))

265.0 g (0.67 mol) behenyl acrylate, 25.0 g (0.18 mol) tert-butyl methacrylate, 2.63 g (0.02 mol) 2-hydroxyethyl methacrylate and 2.63 g (0.012 mol) glycidyl methacrylate are mixed with 79.5 g dipropylene glycol and heated to 60° C. In parallel, a solution of 5.0 g Ethoquad HT 25 and 30.8 g Lutensol ON 110 in 600 g water is prepared at 60° C. in a separate vessel. The aqueous and the organic phase are then mixed with an Ultra-Turrax under strong stirring and then homogenized with an ultrasonic homogenizer for 3 min until a finely divided emulsion is formed. The pre-emulsion is transferred to a three-necked flask. After repeated inerting with nitrogen, 0.72 g lauryl mercaptan is added to the pre-emulsion. Polymerization is started by adding 4.2 g 2.2'-azobis(2-amidinopropane) dihydrochloride at approx. 60° C. Stir for a further 4 h at 60° C. to obtain a white emulsion with a solids content of approx. 32%.

Molar ratio in mol [%]: Monomer M'(1) Monomer M'(2): Monomer M'(3)=e.g. 76:20:4

Preparation of the Conversion Product ((CDI) 1)

In a suitably dimensioned three-necked flask equipped with reflux cooler, adjustable stirrer and internal thermometer 174 g (1 mol) toluene diisocyanate (mixture 2,4-isomer: 2,6-isomer 80:20) are dissolved in 309 g methyl ethyl ketone. Then 135 g (0.5 mol) stearyl alcohol are added in portions, while the mixture is slowly heated to about 80° C. After 1 h stirring, the free NCO content is determined. If the stearyl alcohol has completely converted, 0.7 g LUBIO Polykat 2 (phospholenoxide derivative) is added and the carbodiimidization reaction is started. The reaction mixture is heated for 9 h at 80° C. until no more NCO band is visible in the IR spectrum.

1.73 g Ethoquad HT 25, 0.65 g Arquad 2 C 75 and 1.29 g Lutensol ON 110 are dissolved in 346 g water at 65° C. in a suitably dimensioned beaker.

The aqueous phase and 200 g of the reaction mixture is then stirred with a high-speed stirrer to form a coarse pre-emulsion and subsequently homogenized at 65° C. in a high-pressure homogenizer at 300-500 bar until an average particle size between 0.1 and 10 micrometers is achieved. The solvent is then removed by distillation on a rotary evaporator in a vacuum. If necessary, the pH value of the emulsion obtained is adjusted to 5-7 with 60% acetic acid, the white emulsion obtained is filtered through a 20-micrometer filter and adjusted to a solids content of 20% with water.

Preparation of the Conversion Product ((CDI) 2)

In a suitably dimensioned three-necked flask equipped with reflux cooler, adjustable stirrer and internal thermometer 174 g (1 mol) toluene diisocyanate (mixture 2,4-isomer: 2,6-isomer 80:20) are dissolved in 328 g methyl ethyl ketone. Then 82 g (0.25 mol) behenyl alcohol and 71 g (0.13 mol Pripol 23 (dimer fatty acid diol) are added in portions, while the mixture is slowly heated to about 80° C. After 1 h stirring, the free NCO content is determined. If the two alcohols have been completely converted, 0.7 g LUBIO Polykat 2 (pholene oxide derivative) is added and the carbodiimidization reaction is started. The reaction mixture is heated for 9 h at 80° C. until no more NCO band is visible in the IR spectrum.

0.73 g Ethoquad HT 25, 1.65 g Arquad 2 C 75 and 1.29 g Lutensol ON 110 are dissolved in 346 g water at 65° C. in a suitably dimensioned beaker.

The aqueous phase and 200 g of the reaction mixture is then stirred with a high-speed stirrer to form a coarse pre-emulsion and subsequently homogenized at 65° C. in a high-pressure homogenizer at 300-500 bar until an average particle size between 0.1 and 10 micrometers is achieved. The solvent is then removed by distillation on a rotary evaporator in a vacuum. If necessary, the pH value of the emulsion obtained is adjusted to 5-7 with 60% acetic acid, the white emulsion obtained is filtered through a 20-micrometer filter and adjusted to a solids content of 20% with water.

Preparation of the Preparations (Z) According to the Invention

The emulsions (E) listed in Table 1, containing components (1) and (5), are mixed with component (2). Where appropriate, components (3) and (4) (water) and, where appropriate, (CDI) are added in the weight ratios stated, resulting in the preparations (Z) stated in Tables 2a and 5. Table 2b lists non-inventive hydrophobing agents which are used unchanged in the application examples.

Finishing Examples

Application of Water-Based Preparations (Z) on Textile Fabrics:

Finishing conditions and test results are given in Tables 3a, 3b, 3c, 4, 6, 7, 8 and 9.

TABLE 1

(according to the invention): Preparation of component (1) and its emulsions (E); quantities in grams

| | | | Materials | 1 | 2 | 3 | 4 | 5 | 6 | 7 | 8 |
|---|---|---|---|---|---|---|---|---|---|---|---|
| Compound (A) | (a) | (a1) | glycerol | 92.1 | 92.1 | 92.1 | | | | | |
| | | (a2) | triethanolamine | | | | 149.0 | 149.0 | | | |
| | | (a3) | bis(aminoethyl)amine | | | | | | 103.0 | 103.0 | 103.0 |
| | | | lauric acid | | | | | 400.0 | | | |

TABLE 1-continued (according to the invention): Preparation of component (1) and its emulsions (E); quantities in grams

|  |  |  | Materials | 1 | 2 | 3 | 4 | 5 | 6 | 7 | 8 |
|---|---|---|---|---|---|---|---|---|---|---|---|
| Conversion product (S) = Component (1) | (b) | (b1) | palmitic acid |  | 512.0 | 512.0 |  |  |  |  |  |
|  |  |  | stearic acid |  |  |  | 568.0 |  |  |  |  |
|  |  |  | behenic acid |  |  |  |  |  | 680.0 |  | 680.0 |
|  |  | (b2) | stearyl isocyanate | 591.0 |  |  |  |  |  | 591.0 |  |
|  |  |  | final temperature (T) in ° C. | 90 | 160 | 160 | 165 | 160 | 165 | 90 | 160 |
|  |  |  | acid number (AN) |  | <5 | <5 | <10 | <5 | <5 |  | <5 |
|  |  |  | compound (A) | 123.0 | 156.0 | 156.0 | 141.0 | 134.0 | 113.0 | 128.0 | 113.0 |
|  |  |  | bis(octadecyl)amine |  |  |  |  |  |  |  | 10.4 |
|  |  |  | dimethylaminoethanol |  |  | 5.4 |  |  |  |  |  |
|  | isocyanate (IC) |  | 2,4-toluylene diisocyanate/ trimethylol-propanurethane with 13.5 wt. % NCO | 56.3 |  |  | 64.7 |  | 47.3 |  | 41.0 |
|  |  |  | hexamethylene diisocyanate trimer with 21.7 wt. % NCO |  | 53.1 | 41.4 |  | 50.5 |  | 35.7 |  |
|  | solvent (SO) |  | isopropyl acetate | 179 | 209 | 203 | 206 | 184 | 160 | 164 | 164 |
| Emulsion (E) containing components (1) and (5) |  |  | conversion product (S) | 100.0 | 152.0 | 152.0 | 124.0 | 124.0 | 113.0 | 113.0 | 113.0 |
|  | component (5) |  | Ethoquad HT 25 | 0.25 | 0.53 | 0.53 | 0.31 | 0.31 | 0.40 | 0.40 | 0.40 |
|  | emulsifier (Em) |  | Disponil A 1080 | 2.15 | 4.30 | 4.30 | 2.68 | 2.68 | 2.71 | 2.71 | 2.71 |
|  |  |  | Arquad 2C75 | 1.86 | 3.96 | 3.96 | 2.77 | 2.77 | 2.86 | 2.86 | 2.86 |
|  |  |  | water | 261 | 456 | 456 | 306 | 306 | 341 | 341 | 341 |
|  |  |  | acetic acid 60% | 0.30 | 0.50 | 0.50 | 0.40 | 0.40 | 0.40 | 0.40 | 0.40 |

TABLE 2a

Mixing ratios of the preparation (Z) according to the invention

| Parts by weight [%] emulsion (E) containing components (1) and (5) | Parts by weight [%] Copolymer emulsion (CE) containing components (2) and (5) | Parts by weight [%] Component (3) RUCO-GUARD WEB | Parts by weight [%] Water | Preparation (Z) |
|---|---|---|---|---|
| 45 of (E) 1 | 45 of (CE) 1 | — | 10 | 1 (according to the invention) |
| 45 of (E) 1 | 45 of (CE) 1 | 10 | — | 2 (according to the invention) |
| 45 of (E) 2 | 45 of (CE) 1 | — | 10 | 3 (according to the invention) |
| 45 of (E) 2 | 45 of (CE) 1 | 10 | — | 4 (according to the invention) |
| 45 of (E) 3 | 45 of (CE) 2 | — | 10 | 5 (according to the invention) |
| 45 of (E) 3 | 45 of (CE) 2 | 10 | — | 6 (according to the invention) |
| 45 of (E) 4 | 45 of (CE) 2 | — | 10 | 7 (according to the invention) |
| 45 of (E) 4 | 45 of (CE) 2 | 10 | — | 8 (according to the invention) |
| 45 of (E) 5 | 45 of (CE) 3 | — | 10 | 9 (according to the invention) |
| 45 of (E) 5 | 45 of (CE) 3 | 10 | — | 10 (according to the invention) |
| 45 of (E) 6 | 45 of (CE) 3 | — | 10 | 11 (according to the invention) |
| 45 of (E) 6 | 45 of (CE) 3 | 10 | — | 12 (according to the invention) |
| 45 of (E) 7 | 45 of (CE) 4 | — | 10 | 13 (according to the invention) |
| 45 of (E) 7 | 45 of (CE) 4 | 10 | — | 14 (according to the invention) |
| 45 of (E) 8 | 45 of (CE) 4 | — | 10 | 15 (according to the invention) |
| 45 of (E) 8 | 45 of (CE) 4 | 10 | — | 16 (according to the invention) |

TABLE 2b non-Inventive Preparations (Z)

| Products | Preparation (Z) |
|---|---|
| RUCO-GUARD AFB6 conc | 17 (non-inventive) |
| Frepell 1225 | 18 (non-inventive) |
| Phobotex APK | 19 (non-inventive) |
| Xiameter MEM-0075 | 20 (non-inventive) |

TABLE 3a

Forced application to cotton poplin, 155 g/m²; finishing results

| Application amount of preparation (Z) | 40 g/l in water |
| Liquor absorption: | 80% |
| Drying and condensation: | 2 minutes at 170° C. |

| | Preparation (Z) according to Tab. 2a/2b | according to the invention |||||||||||
|---|---|---|---|---|---|---|---|---|---|---|---|
| | | 1 | 2 | 3 | 4 | 5 | 6 | 7 | 8 | 9 | 10 | 11 |
| Original | AATCC Standard Test Method 22 | 100 | 100 | 100 | 100 | 100 | 100 | 100 | 100 | 100 | 100 | 100 |
| | DIN 53 888 beading effect | 4 | 5 | 4 | 4 | 3 | 4 | 4 | 5 | 2 | 3 | 4 |
| | DIN 53 888 water absorption | 20 | 14 | 22 | 26 | 24 | 23 | 20 | 16 | 28 | 25 | 21 |
| After 10 × 60° C.- washing * | AATCC Standard Test Method 22 | 90 | 90 | 90 | 90 | 90 | 90 | 90 | 30 | 80 | 80 | 90 |

| | Preparation (Z) according to Tab. 2a/2b | according to the invention ||||| non-inventive ||||
|---|---|---|---|---|---|---|---|---|---|---|
| | | 12 | 13 | 14 | 15 | 16 | 17 | 18 | 19 | 20 |
| Original | AATCC Standard Test Method 22 | 100 | 100 | 100 | 100 | 100 | 100 | 90 | 90 | 100 |
| | DIN 53 888 beading effect | 5 | 4 | 5 | 2 | 3 | 5 | 1 | 2 | 1 |
| | DIN 53 888 water absorption | 16 | 22 | 15 | 31 | 26 | 12 | 41 | 35 | 38 |
| After 10 × 60° C.- washing * | AATCC Standard Test Method 22 | 90 | 90 | 90 | 80 | 80 | 90 | 70 | 70 | 70 |

* = according to EN ISO 6330:2000; tumble drying (70° C.)

TABLE 3b

Forced application on PES fabric, 75 g/m²; Finishing results

| Application amount of preparation (Z) | 40 g/l in water |
| Liquor absorption: | 80% |
| Drying and condensation: | 2 minutes at 170° C. |

| | Preparation (Z) according to Tab. 2a/2b | according to the invention |||||||||||
|---|---|---|---|---|---|---|---|---|---|---|---|
| | | 1 | 2 | 3 | 4 | 5 | 6 | 7 | 8 | 9 | 10 | 11 |
| Original | AATCC Standard Test Method 22 | 100 | 100 | 100 | 100 | 100 | 100 | 100 | 100 | 100 | 100 | 100 |
| | DIN 53 888 beading effect | 5 | 5 | 4 | 5 | 4 | 5 | 5 | 5 | 4 | 4 | 5 |
| | DIN 58 888 water absorption in % | 15 | 11 | 19 | 14 | 19 | 12 | 14 | 12 | 21 | 18 | 14 |
| After 10 × 60° C.- washing * | AATCC Standard Test Method 22 | 100 | 100 | 90 | 100 | 90 | 100 | 100 | 100 | 90 | 100 | 90 |

| | Preparation (Z) according to Tab. 2a/2b | according to the invention ||||| non-inventive ||||
|---|---|---|---|---|---|---|---|---|---|---|
| | | 12 | 13 | 14 | 15 | 16 | 17 | 18 | 19 | 20 |
| Original | AATCC Standard Test Method 22 | 100 | 100 | 100 | 100 | 100 | 100 | 90 | 90 | 100 |
| | DIN 53 888 beading effect | 5 | 5 | 5 | 4 | 4 | 5 | 2 | 2 | 3 |
| | DIN 58 888 water absorption in % | 13 | 13 | 11 | 21 | 20 | 10 | 29 | 32 | 26 |
| After 10 × 60° C.- washing * | AATCC Standard Test Method 22 | 100 | 100 | 100 | 90 | 100 | 100 | 70 | 70 | 80 |

* = according to EN ISO 6330:2000; tumble drying (70° C.)

TABLE 3c

Spray application on polyester fabric, laminated on one side with polyester film, 125 g/m²

Finishing result and breathability
(g/m²/24 h) before and after storage

| Application amount of preparation (Z) | 40 g/l in water |
| --- | --- |
| Liquor absorption: | 80% |
| Drying and condensation: | 2 minutes at 170° C. |

| | Preparation (Z) according to Tab. 2a/2b | according to the invention | | | | | | | | | | |
| --- | --- | --- | --- | --- | --- | --- | --- | --- | --- | --- | --- | --- |
| | | 1 | 2 | 3 | 4 | 5 | 6 | 7 | 8 | 9 | 10 | 11 |
| Original | AATCC Standard Test Method 22 | 100 | 100 | 100 | 100 | 100 | 100 | 100 | 100 | 100 | 100 | 100 |
| | breathability JIS L 1099 Method B2 | 7856 | 8512 | 9246 | 8632 | 7985 | 8647 | 9254 | 7968 | 8347 | 8047 | 7583 |
| 7 d, 60° C. | AATCC Standard Test Method 22 | 100 | 100 | 100 | 100 | 100 | 100 | 100 | 100 | 100 | 100 | 100 |
| | breathability JIS L 1099 Method B2 | 7653 | 8045 | 8268 | 7871 | 7654 | 8207 | 8635 | 7057 | 8197 | 7640 | 7045 |
| | decrease in % | 3% | 5% | 11% | 9% | 4% | 5% | 7% | 11% | 2% | 5% | 7% |

| | Preparation (Z) according to Tab. 2a/2b | according to the invention | | | | | non-inventive | | | |
| --- | --- | --- | --- | --- | --- | --- | --- | --- | --- | --- |
| | | 12 | 13 | 14 | 15 | 16 | 17 | 18 | 19 | 20 |
| Original | AATCC Standard Test Method 22 | 100 | 100 | 100 | 100 | 100 | 100 | 90 | 90 | 100 |
| | breathability JIS L 1099 Method B2 | 9224 | 8547 | 8145 | 9158 | 8025 | 7941 | 9784 | 3226 | 8032 |
| 7 d, 60° C. | AATCC Standard Test Method 22 | 100 | 100 | 100 | 100 | 100 | 100 | 90 | 80 | 100 |
| | breathability JIS L 1099 Method B2 | 8067 | 7952 | 7421 | 8547 | 7057 | 7819 | 1099 | 2488 | 7354 |
| | decrease in % | 13% | 7% | 9% | 7% | 12% | 2% | 89% | 23% | 8% |

TABLE 4

Forced application on PES fabric, 75 g/m² subsequent adhesion tests with adhesive fleece

| Application amount of preparation (Z) | 40 g/l in water |
| --- | --- |
| Liquor absorption: | 80% |
| Drying and condensation: | 2 minutes at 170° C. |
| Pressing with adhesive fleece: | 20 seconds 120° C. 2.5 bar |

| Preparation (Z) according to Tab. 2a/2b | according to the invention | | | | | | | | | | | | | | | | non-inventive | | | |
| --- | --- | --- | --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 | 17 | 18 | 19 | 20 |
| Force according to DIN 54310* | 9.5 | 10.1 | 9.6 | 8.9 | 9.1 | 11.2 | 8.1 | 9.0 | 9.7 | 10.2 | 9.8 | 9.1 | 11.1 | 9.8 | 9.5 | 8.8 | 6.0 | 5.2 | 4.6 | 0.8 |

*Separating force
Clamping length: 200 mm
Pre-measurement path length: 20 mm
Test speed: 230 mm
Measuring distance: 230 mm

TABLE 5

Mixing ratios of the preparations (Z) according to the invention

| Parts by weight [%] emulsion (E) containing components (1) and (5) | Parts by weight [%] Copolymer emulsion (CE) containing components (2) and (5) | Parts by weight [%] (CDI) | Parts by weight [%] Water | Preparation (Z) |
|---|---|---|---|---|
| 45 of (E) 1 | 45 of (CE) 1 | 10 (CDI) 1 | — | 21 (according to the invention) |
| 45 of (E) 2 | 45 of (CE) 1 | 10 (CDI) 2 | — | 22 (according to the invention) |

TABLE 6

Forced application to cotton poplin, 155 g/m$^2$,

Finishing results

| Application amount of preparation (Z): | 40 g/l in water |
| Liquor absorption: | 80% |
| Drying and condensation: | 2 minutes at 170° C. |

| | Preparation (Z) according | according to the invention | |
|---|---|---|---|
| | to Tab. 5 | 21 | 22 |
| Original | AATCC Standard Test Method 22 | 100 | 100 |
| | DIN 53 888 beading effect | 5 | 5 |
| | DIN 53 388 water absorption in % | 17 | 16 |
| After 10 × 60° C. washing* | AATCC Standard Test Method 22 | 90 | 90 |

*= according to EN ISO 6330:2000; tumble drying (70° C.)

TABLE 7

Forced application on PES fabric, 75 g/m$^2$

Finishing results

| Application amount of preparation (Z): | 40 g/l in water |
| Liquor absorption: | 80% |
| Drying and condensation: | 2 minutes at 170° C. |

| | Preparation (Z) according | according to the invention | |
|---|---|---|---|
| | to Tab. 5 | 21 | 22 |
| Original | AATCC Standard Test Method 22 | 100 | 100 |
| | DIN 53 888 beading effect | 5 | 5 |
| | DIN 53 888 water absorption in % | 12 | 11 |
| After 10 × 60° C. washing* | AATCC Standard Test Method 22 | 100 | 100 |

*= according to EN ISO 6330:2000; tumble drying (70° C.)

TABLE 8

Spray application on polyester fabric, laminated on one side with polyester film, 125 g/m$^2$ Finishing results and breathability (g/m$^2$/24 h) before and after storage

| Application amount of preparation (Z): | 40 g/l in water |
| Liquor absorption: | 80% |
| Drying and condensation: | 2 minutes at 170° C. |

| | Preparation (Z) according | according to the invention | |
|---|---|---|---|

TABLE 8-continued

Spray application on polyester fabric, laminated on one side with polyester film, 125 g/m$^2$

| | to Tab. 5 | 21 | 22 |
|---|---|---|---|
| Original | AATCC Standard Test Method 22 | 100 | 100 |
| | Breathability JIS L 1099 Method B2 | 8432 | 8158 |
| 7 d, 60° C. | AATCC Standard Test Method 22 | 100 | 100 |
| | Breathability JIS L 1099 Method B2 | 8015 | 7796 |
| | decrease in % | 5% | 4% |

TABLE 9

Forced application on PES fabric, 75 g/m$^2$, then adhesion tests with adhesive fleece

| Application amount of preparation (Z): | 40 g/l in water |
| Liquor absorption: | 80% |
| Drying and condensation: | 2 minutes at 170° C. |
| Pressing with adhesive fleece: | 20 seconds 120° C. 2.5 bar |

| Preparation (Z) according | according to the invention | |
|---|---|---|
| to Tab. 5 | 21 | 22 |
| Force according to DIN 54310 * | 9.0 | 8.5 |

| * Separating force | |
|---|---|
| Clamping length | 200 mm |
| Pre-measurement path length | 20 mm |
| Test speed | 230 mm |
| Measuring distance | 230 mm |

The invention claimed is:

1. Preparation (Z), comprising
   (1) at least one conversion product (S) obtainable by reacting at least one compound (A) of the formula

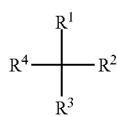

(AI)

and/or

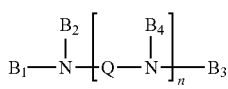

wherein R¹ is —X—Y—Z or —Z with
X=—(CH$_2$)$_{n'''}$—,
Y=

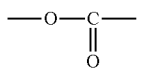

or,

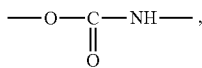

Z=—(CH$_2$)$_m$—CH$_3$,
R² is

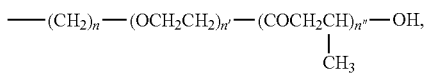

R³ is —X—Y—Z, —Z or —Y—Z, with the provision that in the case of the meaning of —Y—Z n is replaced by n″ in residue R²,
R⁴ is —X—Y—Z or —(CH$_2$)$_n$H,
B¹ —V—W—Z or —Z, with
V=—(CH$_2$)$_{n'''}$— or

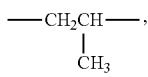

W=

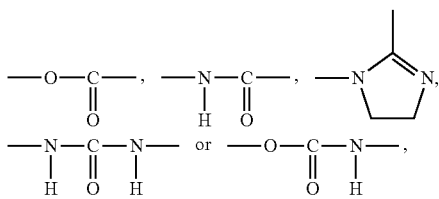

B² is —(CH$_2$)$_{n'''}$—NH$_2$, or

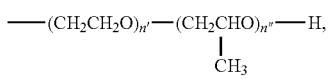

B³ is —V—W—Z, —Z or

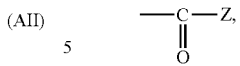

B⁴ is —V—W—Z or

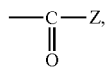

Q is —(CH$_2$)$_{n'''}$— and
n, n′, n″, n‴ and m are each independently an integer, wherein
n=0-2,
n′=0-4,
n″=1-4,
n‴=0-4 and
m=8-30,
with at least one unblocked or at least partially blocked di-, tri- or polyisocyanate (IC), wherein the proportion of free isocyanate (NCO) groups in the polyisocyanate (IC) is between. 1.8 and 10 per mole,
(2) at least one copolymer (C) comprising at least one building block of the formula

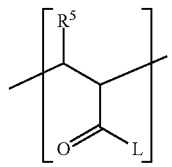

wherein

L is —O—R⁶, —NH—R⁶,

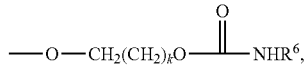
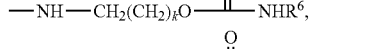
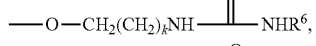

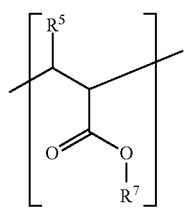

and/or

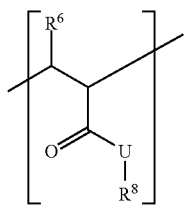
(M(3))

wherein
$R^5$ is —H or —CH$_3$,
$R^6$ is a $C_{12}$-$C_{40}$ hydrocarbon residue,
$R^7$ is a linear or branched aliphatic $C_1$-$C_8$ hydrocarbon residue,
U is —O— or —NH—,
$R^8$ is

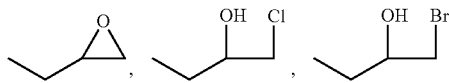

or —CH$_2$—(CH$_2$)$_p$—OH, and k and p are each independently an integer wherein
k=1-5 and
p=0-10,
(3) optionally at least one unblocked or at least partially blocked di-, tri or polyisocyanate,
(4) optionally water and/or at least one organic solvent and
(5) optionally at least one surface-active substance.

2. The preparation (Z) according to claim 1, wherein the preparation (Z) is free from fluorine compounds.

3. The preparation (Z) according to claim 1, wherein the component (1) accounts for 10-90 wt. %.

4. The preparation (Z) according to claim 1, wherein the component (2) accounts for 10-90 wt. % relative to the total preparation (Z).

5. The preparation (Z) according to claim 1, wherein the component (3) accounts for 0-50 wt. % relative to the total preparation (Z).

6. The preparation (Z) according to claim 1, wherein the component (4) accounts for 20-99.9 wt. % relative to the total preparation (Z).

7. The preparation (Z) according to claim 1, wherein the component (5) accounts for 0-20 wt. % relative to the total amount of components (1), (2) and optionally (3) and/or optionally (5).

8. The preparation (Z) according to claim 1, wherein the component (2) contains 30-90 mol-% of the building block M(1).

9. The preparation (Z) according to claim 1, wherein the component (2) contains 5-65 mol % of the building block M(2).

10. The preparation (Z) according to claim 1, wherein the component (2) contains 0.1-8 mol % of the building block M(3).

11. The preparation (Z) according to claim 1, wherein the component (2) contains 30-90 mol % of the building block M(1), 5-65 mol % of the building block M(2) and 0.1-5 mol % of the building block M(3).

12. The preparation (Z) according to claim 1, wherein for the conversion product (S) the molar ratio of free isocyanate (NCO) groups in the polyisocyanate (IC) to isocyanate-reactive groups in compound (A) is adjusted to 1:1 to 1:1.3.

13. The preparation (Z) according to claim 12, wherein the isocyanate-reactive groups are hydroxy groups and/or primary amino groups.

14. The preparation (Z) according to claim 1, wherein the compound (A) is hydrophobic.

15. The preparation (Z) according to claim 1, wherein the isocyanate (IC) is selected from the group consisting of 2,4-toluene diisocyanate, 2,4'-diphenylmethane diisocyanate, 4,4'-diphenylmethane diisocyanate (MDI), higher chain homologues of the diphenylmethane diisocyanate (polymer MDI), 4-methyl-cyclohexane-1,3-diisocyanate, tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate, dimer diisocyanate and mixtures.

16. The preparation (Z) according to claim 1, wherein the organic solvent of component (4) is selected from esters, ketones, and saturated hydrocarbons.

17. The preparation (Z) according to claim 1, wherein component (5) is selected from anionic, cationic and non-ionic surfactants.

18. The preparation (Z) according to claim 1 further comprising
at least one conversion product (CDI) obtainable by
a) Providing at least one di-, tri- or polyisocyanate (IC),
b) Reacting (IC) with at least one organic compound (O) which contains at least one isocyanate-reactive group, wherein the molar ratio of isocyanate groups to isocyanate-reactive groups is adjusted to 10:1 to 3:2, and
c) Carbodiimidizing the products present after step b) with a catalyst at temperatures of 25-150° C.

19. The preparation (Z) according to claim 18, wherein the organic compound (O) is selected from the group consisting of monoamine, monoalcohol, diamine, diol, polyamine and polyol.

20. The preparation (Z) according to claim 19, wherein the monoalcohol is selected from cetyl alcohol, stearyl alcohol, behenyl alcohol, glycerin distearate, glycerin dibehenate, pentaerythritol tristearate, sorbitan tristearate, triethanolamine distearate and mixtures thereof.

21. The preparation (Z) according to claim 19, wherein the monoamine is selected from stearylamine, distearylamine, conversion products of diethanolamine with fatty acids, and mixtures thereof.

22. The preparation (Z) according to claim 19, wherein the diamine is selected from dimer fatty acid diamines.

23. The preparation (Z) according to claim 19, wherein the diol is selected from dimer fatty acid diols.

24. The preparation (Z) according to claim 18, wherein the organic compound (O) is selected from the group consisting of
$R^9$—OH,
$R^9$—NH$_2$,
HO—$R^{10}$—OH and
H$_2$N—$R^{10}$—NH$_2$, wherein
$R^9$ is a saturated or unsaturated hydrocarbon residue having 12-40 carbon atoms, which may optionally contain at least one group selected from —CO—O—, —CO—, —CO—NH— and —O— and is optionally substituted with at least one polyalkylene oxide, cationic, anionic and/or amphoteric group, and R¹⁰ is a saturated or unsaturated hydrocarbon group residue having 12-40 carbon atoms which may optionally contain at least one group selected from —CO—O—, —CO—, —CO—NH— and —O— and is optionally substituted with at least one polyalkylene oxide, cationic, anionic and/or amphoteric group.

25. The preparation (Z) according to claim 24, wherein the cationic group is selected from an ammonium group.

26. The preparation (Z) according to claim 24, wherein the anionic group is selected from carboxylate, sulfonate and/or phosphate.

27. The preparation (Z) according to claim 24, wherein the amphoteric group is selected from a betaine and/or stab betaine.

28. The preparation (Z) according to claim 18, wherein the catalyst for carbodiimidizing is selected from phospholene oxides, in particular 3-methyl-1-phenyl-2-phospholenoxide, 1-methyl-3-phospholenoxide, 1-methyl-2-phospholenoxide, 1,3-dimethyl-2-phospholenoxide and 1,3-dimethyl-3-phospholenoxide, and mercury compounds.

29. The preparation (Z) according to claim 18, wherein the conversion product (CDI) is 1-50 wt. % relative to the total preparation.

30. The preparation (Z) according to claim 1, further comprising at least one conversion product (CDI) obtainable by a) Providing at least one di-, tri- or polyisocyanate (IC),
b) Carbodiimidizing of (IC) with a catalyst at temperatures of 25-150° C., and
c) Reacting the products present after step b) with at least one organic compound (O) which contains at least one isocyanate-reactive group, wherein the molar ratio of isocyanate groups to isocyanate-reactive groups is adjusted to a ratio of 1:1.

31. A method for hydrophobizing substrates, comprising applying the preparation (Z) according to claim 1 to a substrate.

32. The method according to claim 31, wherein the substrate is a fabric.

33. The method according to claim 31, wherein the substrate is a textile, paper, leather, or mineral fabric.

34. The method according to claim 31, wherein the preparation (Z) is added as an additive in paints, varnishes or plasters, and then applied to the substrate.

35. The method according to claim 31, wherein the application is by spraying, dipping, impregnating, painting or sponge application.

36. The method according to claim 31, wherein the preparation (Z) is applied to a textile substrate by forced application or by the exhaust method.

37. The method according to claim 31, wherein the preparation (Z) is applied to an already washed textile substrate.

* * * * *